(12) United States Patent
Özhan

(10) Patent No.: US 10,997,399 B1
(45) Date of Patent: May 4, 2021

(54) FACIAL RECOGNITION TOOL

(71) Applicant: Karya Property Management, LLC, Houston, TX (US)

(72) Inventor: Alper Özhan, Houston, TX (US)

(73) Assignee: Karya Property Management, LLC, Houston, TX (US)

( * ) Notice: Subject to any disclaimer, the term of this patent is extended or adjusted under 35 U.S.C. 154(b) by 0 days.

(21) Appl. No.: 16/693,702

(22) Filed: Nov. 25, 2019

(51) Int. Cl.
| | |
|---|---|
| *G06K 9/00* | (2006.01) |
| *G06K 9/62* | (2006.01) |
| *G06F 16/783* | (2019.01) |
| *G06N 3/04* | (2006.01) |
| *G06T 3/40* | (2006.01) |

(52) U.S. Cl.
CPC ....... *G06K 9/00288* (2013.01); *G06F 16/784* (2019.01); *G06K 9/00362* (2013.01); *G06K 9/00926* (2013.01); *G06K 9/6215* (2013.01); *G06N 3/04* (2013.01); *G06T 3/40* (2013.01); *G06K 9/00221* (2013.01)

(58) Field of Classification Search
CPC .... G06K 9/00771; G06K 9/46; G06K 9/6267; G06T 2207/20084
See application file for complete search history.

(56) References Cited

U.S. PATENT DOCUMENTS

| | | |
|---|---|---|
| 2005/0147291 A1 | 7/2005 | Huang et al. |
| 2017/0083755 A1* | 3/2017 | Tang .................. G06K 9/00268 |
| 2018/0032796 A1 | 2/2018 | Kuharenko et al. |
| 2018/0107865 A1 | 4/2018 | Ahlawat |
| 2018/0130324 A1 | 5/2018 | Yu et al. |
| 2019/0023208 A1* | 1/2019 | Boston ............... G06K 9/00308 |
| 2019/0213451 A1* | 7/2019 | Schafer .................... G06N 3/08 |
| 2019/0278976 A1 | 9/2019 | Khadloya et al. |
| 2019/0318171 A1* | 10/2019 | Wang ....................... G06K 9/34 |
| 2020/0025877 A1* | 1/2020 | Sarkis ..................... G01S 7/417 |
| 2020/0044852 A1* | 2/2020 | Streit .................. G06F 21/6245 |

FOREIGN PATENT DOCUMENTS

| | | |
|---|---|---|
| KR | 101793510 B1 | 11/2017 |
| WO | 2016/179808 A1 | 11/2016 |

OTHER PUBLICATIONS

International Search Report and Written Opinion issued in related PCT Application No. PCT/US2020/061556 dated Mar. 22, 2021, 11 pages.

* cited by examiner

*Primary Examiner* — Kenny A Cese
(74) *Attorney, Agent, or Firm* — Baker Botts L.L.P.

(57) ABSTRACT

Disclosed embodiments include systems and methods employing a neural network to identify a tenant as the tenant walks into a management office by using facial recognition. The neural network provides a database of information related to each tenant and coupled to a given tenant's facial features. A method comprises of identifying facial features within an image of a tenant via a computer system, wherein the image is taken as the tenant enters into an office; cropping an image of a tenant; transmitting the cropped image to a convolutional neural network as an input; categorizing the input as an output; and displaying information regarding the tenant via an I/O interface of the computer system.

18 Claims, 3 Drawing Sheets

FACIAL RECOGNITION TOOL

TECHNICAL FIELD

Embodiments of the present disclosure relate to a neural network, more particularly, to a neural network for use in facial recognition.

BACKGROUND

Facial recognition processes are used in many contexts to identify users.

BRIEF DESCRIPTION OF THE DRAWINGS

For a more complete understanding of the present disclosure and its features and advantages, reference is now made to the following description, taken in conjunction with the accompanying drawings, in which.

Figure 1:
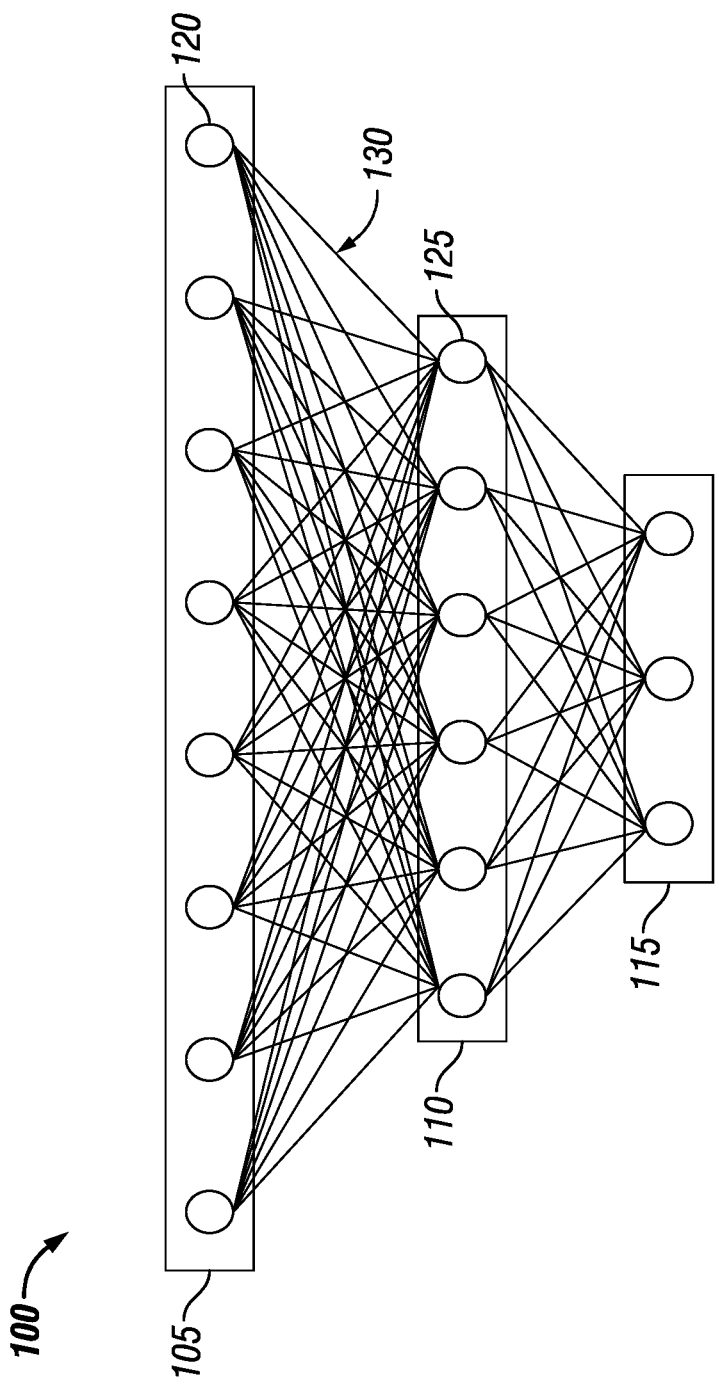
FIG. 1 illustrates an artificial neural network, in accordance with an embodiment of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Disclosed embodiments are directed to systems and methods employing a neural network to identify a tenant as the tenant walks into a management office by using facial recognition. The neural network may provide a database of information related to each tenant and coupled to a given tenant's facial features. For example, a picture of the tenant's face may be taken and processed as the tenant walks into the management office. The picture may be compared to data provided on the database over the neural network. The facial features, or collectively the face, may match those already stored on the database within a specific tolerance. Information related to the tenant whose facial features match those stored on the database may be displayed to an employee within the management office. The employee may provide a more intimate interaction with the tenant by referencing the displayed information rather than asking for said tenant's name and/or other information. Without limitations, the any suitable information may be utilized, such as work orders, rent payment schedule, delinquency, prior conversations or notes with the tenant, and combinations thereof.

For a given property, tenants often visit the management office in order to address a situation or problem. There may be a multitude of different tenants visiting the management office in a single day with a plurality of problems. Currently, an employee within the management office has to take the time to look up a given tenant's information. This is inefficient and wastes time for each tenant. Over time, the employee may recognize the tenant and know the tenant's relevant information. However, this is uncommon and unlikely for a majority of the tenants. As such, it is desirable to provide a system that can identify a tenant as said tenant walks into the management office.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

FIG. 1 illustrates an example artificial neural network ("ANN") 100. ANN 100 may comprise an input layer 105, a hidden layer 110, and an output layer 115. Hidden layer 110 may be an intermediate layer between the input layer 105 and the output layer 115. In embodiments, there may be a plurality of hidden layers 110. Each layer of ANN 100 may comprise one or more nodes, such as node 120 or node 125. In embodiments, each node of a layer may be connected to one or more nodes of a previous or subsequent layer. For example, each node of input layer 105 may be connected to one of more nodes of hidden layer 110. As illustrated, the number of nodes may decrease from the input layer 105 to the hidden layer 110 to the output layer 115. However, ANN 100 may be configured to comprise any number of nodes in any suitable layer. For example, the hidden layer 110 may comprise more nodes than either the input layer 105 or the output layer 115. In particular embodiments, ANN 100 may comprise one or more bias nodes (e.g., a node in a layer that is not connected to and does not receive input from any node in a previous layer) (not illustrated). Although FIG. 1 depicts a certain ANN with a particular number of layers, a particular number of nodes, and particular connections between nodes, this disclosure contemplates any suitable ANN with any suitable number of layers, any suitable number of nodes, and any suitable connections between nodes. For example and without limitation, although FIG. 1 depicts a connection between each node of input layer 105 and each node of hidden layer 110, one or more nodes of input layer 105 may not be connected to one or more nodes of hidden layer 110.

In embodiments, an activation function may correspond to each node of an ANN. An activation function of a node may define the output of a node for a given input. In embodiments, information input to a node may comprise a set of inputs. In particular embodiments, the input of an activation function corresponding to a node may be weighted. Each node may generate an output using a corresponding activation function based on weighted inputs. In particular embodiments, an ANN may be a feedforward ANN (e.g., an ANN with no cycles or loops where communication between nodes flows in one direction beginning with the input layer and proceeding to successive layers). For example, the input to each node of hidden layer 110 may comprise the output of one or more nodes of input layer 105. As another example and without limitation, the input to each node of output layer 115 may comprise the output of one or more nodes of hidden layer 110. In these embodiments, each connection between nodes may be associated with a weight. For example, and without limitation, a connection 130 between node 120 and node 125 may have a weighting coefficient of 0.4, which may indicate that 0.4 multiplied by the output of node 120 is used as an input to node 125. In certain embodiments, the assigned weighting coefficients may be randomized. The weight of said input may increase or decrease the strength of the signal at a designated connection between nodes. Although this disclosure may describe specific connections and weights between nodes, the present disclosure contemplates any suitable connections and weights between nodes. In embodiments, the weights and activation functions may be modified through a suitable learning rule of ANN 100. Without limitations, the suitable learning rule may fall under the category of unsupervised learning, supervised learning, reinforcement learning, and/or combinations thereof.

In embodiments, the input to the nodes of the input layer 110 may be based on the data input into the ANN. Any suitable data information may be used as inputs to and outputs of the nodes. With regards to the present disclosure, a picture, facial information, tenant information, and/or combinations thereof may be used as inputs to and/or outputs of the nodes, without limitation. In embodiments, facial information may comprise of any suitable information related to a face. Without limitations, facial information may comprise of hair color, hair style, hair length, eye color, shape of nose, shape of mouth, facial hair, color of skin, shape of ears, distance between facial features, displacement of facial features, distinguishing characteristics (i.e., scars), and/or combinations thereof. In embodiments, tenant information may comprise any suitable information related to a tenant. Without limitation, tenant information may comprise of tenant name, date of birth, unit number, floor of unit, unit style, information regarding rent (i.e., rent amount, whether rent has been paid or is late, etc.), lease information (i.e., move-in date), work order description and/or status, and/or combinations thereof. With regards to the present disclosure, such information may be processed by a computer system disposed within a given management office of a property.

Figure 2:
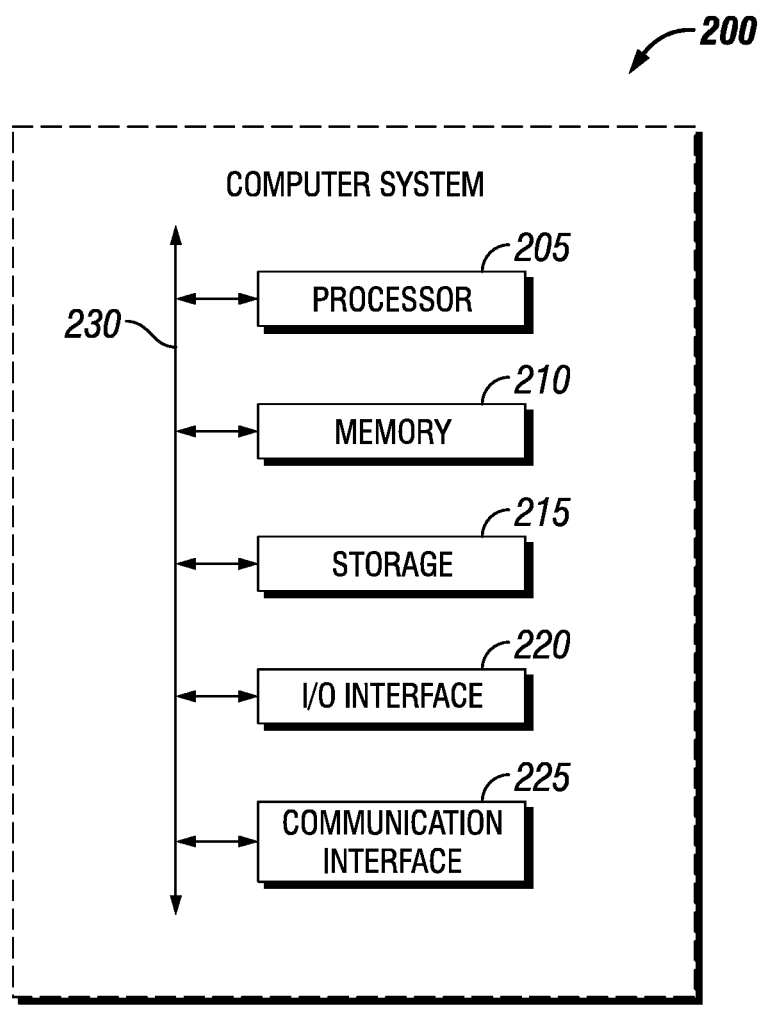
FIG. 2 illustrates a computer system, in accordance with an embodiment of the present disclosure.

FIG. 2 illustrates an example computer system 200. In embodiments, one or more computer systems 200 may perform one or more steps of one or more methods described or illustrated herein as the disclosed node in ANN 100 (referring to FIG. 1). In particular embodiments, software running on one or more computer systems 200 may perform one or more steps of one or more methods described or illustrated herein or may provide functionality described herein. Herein, reference to a computer system may encompass a computing device, and vice versa, where appropriate. Moreover, reference to a computer system may encompass one or more computer systems, where appropriate.

With regards to the present disclosure, any suitable number of computer systems 200 may function as a node in ANN 100. As disclosed, computer system 200 may comprise any suitable physical form. For example and without limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, and/or any combinations thereof. Where appropriate, computer system 200 may include one or more computer systems 200; be unitary or distributed; span multiple locations; span multiple machines; span multiple data centers; and/or reside in a cloud, which may include one or more cloud components in one or more networks. Where appropriate, one or more computer systems 200 may perform, without substantial spatial or temporal limitation, one or more steps of one or more methods described or illustrated herein. For example and without limitation, one or more computer systems 200 may perform in real time or in batch mode one or more steps of one or more methods described or illustrated herein. One or more computer systems 200 may perform at different times and/or at different locations one or more steps of one or more methods described or illustrated herein, where appropriate.

In embodiments, computer system 200 may comprise a processor 205, memory 210, storage 215, an input/output (I/O) interface 220, a communication interface 225, and a bus 230. Processor 205 may include hardware for executing instructions, such as those making up a computer program. For example and without limitation, to execute instructions, processor 205 may retrieve the instructions from an internal register, an internal cache, memory 210, and/or storage 215; decode and execute them; and then write one or more results to an internal register, an internal cache, memory 210, and/or storage 215. In embodiments, processor 205 may include one or more internal caches for data, instructions, or addresses. Without limitations, processor 205 may include any suitable number of internal caches. For example, processor 205 may include one or more instruction caches, one or more data caches, and/or one or more translation lookaside buffers (TLBs). Instructions in the instruction caches may be copies of instructions in memory 210 or storage 215, and the instruction caches may speed up retrieval of those instructions by processor 205. Data in the data caches may be copies of data in memory 210 or storage 215 for instructions executing at processor 205 to operate on; the results of previous instructions executed at processor 205 for access by subsequent instructions executing at processor 205 or for writing to memory 210 or storage 215; or other suitable data. The data caches may speed up read or write operations by processor 205. The TLBs may speed up virtual-address translation for processor 205. In embodiments, processor 205 may include one or more internal registers for data, instructions, or addresses. Without limitations, processor 205 may include any suitable number of internal registers. Without limitations, processor 205 may include one or more arithmetic logic units (ALUs); be a multi-core processor; or include one or more processors 205. Although this disclosure describes and illustrates a particular processor, any suitable processor may be operable in computer system 200.

In embodiments, memory 210 may include main memory for storing instructions for processor 205 to execute or data for processor 205 to operate on. For example, computer system 200 may load instructions from storage 215 or another source (such as, for example, another computer system 200) to memory 210. Processor 205 may then load the instructions from memory 210 to an internal register or internal cache. To execute the instructions, processor 205 may retrieve the instructions from the internal register or internal cache and decode them. During or after execution of the instructions, processor 205 may write one or more results (which may be intermediate or final results) to the internal register or internal cache. Processor 205 may then write one or more of those results to memory 210. In embodiments, processor 205 may only execute instructions in one or more internal registers or internal caches or in memory 210 (as opposed to storage 215 or elsewhere) and only operate on data in one or more internal registers or internal caches or in memory 210 (as opposed to storage 215 or elsewhere). One or more memory buses (which may each include an address bus and a data bus) may couple processor 205 to memory 210. Bus 230 may include one or more memory buses, as described below. In embodiments, one or more memory management units (MMUs) may reside between processor 205 and memory 210 and may facilitate access to memory 210 requested by processor 205. In embodiments, memory 210 may include random access memory (RAM). This RAM may be volatile memory. Where appropriate, this RAM may be dynamic RAM (DRAM) or static RAM (SRAM). Moreover, this RAM may be single-ported or multi-ported RAM. In embodiments, there may be one or more memories 210. Although this disclosure describes and illustrates particular memory, any suitable memory may be operable in computer system 200.

In embodiments, storage 215 may include mass storage for data or instructions. Without limitations, storage 215 may include a hard disk drive (HDD), a floppy disk drive, flash memory, an optical disc, a magneto-optical disc, magnetic tape, a Universal Serial Bus (USB) drive, and/or combinations thereof. Storage 215 may include removable or non-removable media. Storage 215 may be internal or external to computer system 200, where appropriate. In embodiments, storage 215 is non-volatile, solid-state memory. In certain embodiments, storage 215 may include read-only memory (ROM). Without limitations, this ROM may be mask-programmed ROM, programmable ROM (PROM), erasable PROM (EPROM), electrically erasable PROM (EEPROM), electrically alterable ROM (EAROM), flash memory, and/or combinations thereof. Mass storage 215 may take any suitable physical form. Storage 215 may include one or more storage control units facilitating communication between processor 205 and storage 215. There may be one or more storages 215. Although this disclosure describes and illustrates particular storage, any suitable storage may be operable in computer system 200.

In embodiments, I/O interface 220 may include hardware, software, or both, providing one or more interfaces for communication between computer system 200 and one or more I/O devices. Computer system 200 may include one or more of these I/O devices, where appropriate. One or more of these I/O devices may enable communication between an operator and computer system 200. Without limitations, an I/O device may include a keyboard, keypad, microphone, monitor, mouse, printer, scanner, speaker, still camera, stylus, tablet, touch screen, trackball, video camera, another suitable I/O device, and/or combinations thereof. An I/O device may include one or more sensors. Where appropriate, I/O interface 220 may include one or more device or software drivers enabling processor 205 to drive one or more of these I/O devices. Although this disclosure describes and illustrates a particular I/O interface, any suitable I/O interface may be operable in computer system 200.

In embodiments, communication interface 225 may include hardware, software, or both providing one or more interfaces for communication (such as, for example, packet-based communication) between computer system 200 and one or more other computer systems 200 or one or more networks. Without limitations, communication interface 225 may include a network interface controller (NIC) or network adapter for communicating with an Ethernet or other wire-based network or a wireless NIC (WNIC) or wireless adapter for communicating with a wireless network, such as a WI-FI network. Any suitable network and any suitable communication interface 225 may be used regarding the present disclosure. Without limitations, computer system 200 may communicate with an ad hoc network, a personal area network (PAN), a local area network (LAN), a wide area network (WAN), a metropolitan area network (MAN), one or more portions of the Internet, and/or combinations thereof. In embodiments, one or more portions of one or more of these networks may be wired or wireless. Without limitations, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), other suitable wireless network, and/or combinations thereof. Computer system 200 may include any suitable communication interface 225 for any of these networks, where appropriate. There may be one or more communication interfaces 225. Although this disclosure describes and illustrates a particular communication interface, any suitable communication interface may be operable in computer system 200.

In embodiments, bus 230 may include hardware, software, or both for coupling components of computer system 200 to each other. There may be one or more buses 230, where appropriate. Although this disclosure describes and illustrates a particular bus, any suitable bus may be used in computer system 200.

Herein, a computer-readable non-transitory storage medium or media may include one or more semiconductor-based or other integrated circuits (ICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, and/or combinations thereof. A computer-readable non-transitory storage medium may be volatile, non-volatile, or a combination of volatile and non-volatile, where appropriate.

Figure 3:
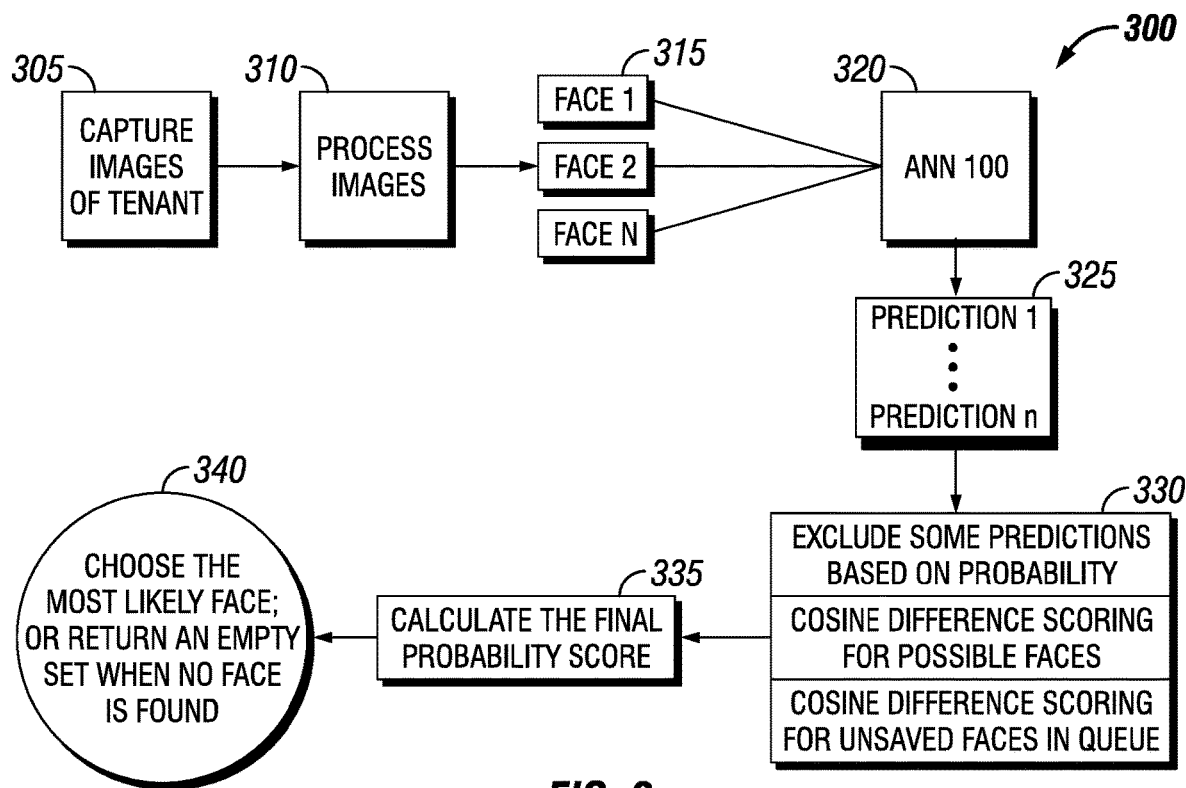
FIG. 3 illustrates a workflow for facial recognition, in accordance with an embodiment of the present disclosure.

FIG. 3 illustrates a workflow 300 describing a method of identifying a tenant using facial recognition. In embodiments, a tenant may walk into a management office. There may be a camera disposed within the management office. In certain embodiments, there may be a plurality of cameras. The camera may be continuously operating and/or may be actuated to operate by an employee within the management office. The camera may be disposed so as to angle the recording lens to face an entrance of the management office. As the tenant walks into the management office, the camera may operate to record video and/or to capture images of the tenant at a step 305 of the workflow 300. The recorded video and/or captured images may then be processed by computer system 200 (referring to FIG. 2) to identify frames of the recorded video or specific images where the face of the tenant is clearly depicted at a step 310. In embodiments, each frame may be treated as an individual image. Within step 310, the computer system 200 may analyze each image to determine the presence of a head structure (i.e., the tenant's face). Determination of the head structure may be based on whether or not the image contains a generally circular shape. Step 310 further provides for identifying facial features such as, but not limited to, at least one eye, a mouth, and a nose. In embodiments, any suitable algorithm may be used to identify the facial features. Once the computer system 200 has determined that the head structure contains facial features, the image depicting said head structure with facial features may be cropped. Without limitations, the computer system 200 may crop about 5%, 10%, 20%, 30%, 40%, 50%, 60%, 70%, 80%, or 90% of the original image. Cropping may be done automatically through the computer system 200 to provide a processed image with enhanced clarity with regards to the focal point of the face of the tenant. The cropped image may be used as an input 315 into ANN 100. In embodiments, there may be a plurality of inputs 315 produced by the computer system 200. The computer system 200 may send each one of the inputs 315 to ANN 100 at a step 320. Alternatively, the computer system 200 may compare the inputs 315 to a local database using any suitable software prior to sending the inputs 315 to ANN 100. In embodiments, ANN 100 may be a trained convolutional neural network (CNN), further described in FIG. 4 below.

Figure 4:
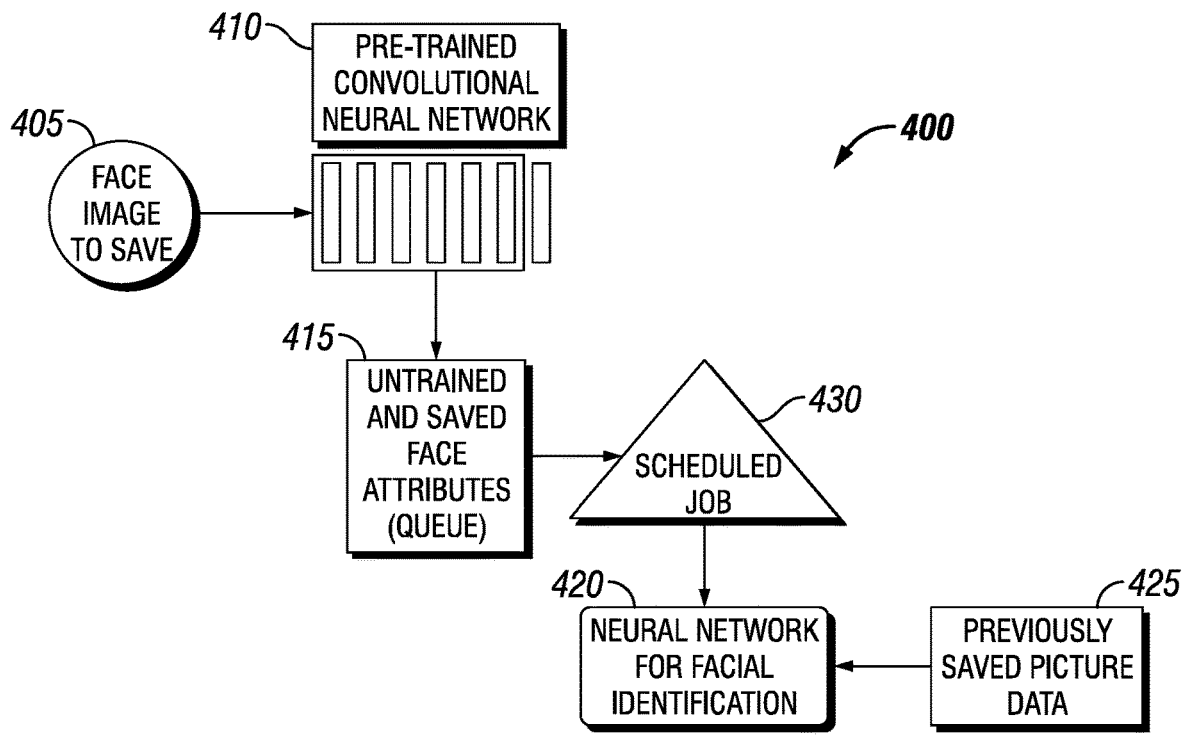
FIG. 4 illustrates a block diagram of a trained convolutional neural network, in accordance with an embodiment of the present disclosure.

FIG. 4 illustrates a system 400 to be used in the workflow 300 (referring to FIG. 3). In embodiments, a user may send an image of a face 405 to an external network 410 when a tenant has not been entered into the system 400 yet. Without limitations, the external network 410 may be a pre-trained convolutional neural network that comprises a plurality of images. In certain embodiments, the sent face image 405 may be matched with images present in the external network 410. Then, facial attributes of the matched images may be extracted from the external network 410 and saved to be queued into a trained CNN 420. The state wherein the facial attributes are untrained and queued may be designated as 415. In order to train the trained CNN 420, a scheduled job 430 may be performed to allocate time to input the extracted facial attributes. Once the schedule job 430 occurs, the trained CNN 420 may be able to identify a newly captured image 425 for a future occurrence.

With reference back to FIG. 3, ANN 100 at step 320 may go back one level to an intermediate level (i.e., hidden layer 110 as shown on FIG. 1) to access facial features stored in a matrix. ANN 100 may add the nodes per intermediate layer to be trained in fine-tuning. Using a loss function with an activation function, ANN 100 may categorize the face in a given input 315 with an output 325. Without limitations, the activation function may be sigmoid activation. Without limitations, the loss function may be a categorical entropy classifier wherein the probability of each image is independent from each other. In embodiments, this output 325 is an assignment of a probability between 0 and 1, wherein 1 is a perfect match. Each output 325 may then be processed at a step 330. Step 330 may comprise of excluding certain outputs 325 based on a threshold of probability. In embodiments, the threshold of probability may be any suitable value between 0% and 100%. Without limitations, the threshold of probability may be about 85%. For the outputs with acceptable probabilities, the similarity function may be calculated between the current facial features of a given input 315 and those of the facial features in the past previously saved on ANN 100. Without limitations, the similarity function may be any suitable means of measuring similarity, for example cosine similarity, cosine difference, hamming distance, or Euclidian distance. For the inputs 315 that are in queue and are not trained, the similarity function may be calculated between the current facial features of a given input 315 and those of the facial features in the past previously saved on ANN 100. In these embodiments, there may be a higher acceptable probability threshold for matching the current facial features of the given input 315 to those of the inputs 315 in queue. The outputs 325 and/or similarity functions may then be used in a step 335. Step 335 may comprise of calculating the final probability scores. A concluding step 340 may follow the calculation of the final probability scores. Concluding step 340 may display information regarding the tenant who walked into the management office in step 305 based on the final probability scores. The displayed information may comprise an image of the face of the tenant, tenant information, and/or combinations thereof. In certain embodiments, information related to multiple tenants may be displayed based on the final probability scores. In these embodiments, the employee may be able to manually associate the present tenant with the sets of information displayed.

If the tenant's face had never been saved to ANN 100 and/or the computer system 200 (referring to FIG. 2), then there may not be a display of information in concluding step 340. Concluding step 340 may comprise of prompting the employee in the management office to assign the inputs 315 of the present tenant to existing tenant information within ANN 100 or to add the inputs 315 as a new entry. If the inputs 315 are added as a new entry, the employee may further add tenant information in conjunction with the inputs 315 to ANN 100.

Although the disclosure and its advantages have been described in detail, it should be understood that various changes, substitutions and alterations can be made herein without departing from the spirit and scope of the disclosure as defined by the following claims.

What is claimed is:

1. A method, comprising:
   identifying facial features within an image of a tenant via a computer system, wherein the image is taken as the tenant enters into an office;
   cropping the image of a tenant after identifying the facial features;
   transmitting the cropped image to a convolutional neural network as an input, wherein the convolutional neural network comprises a plurality of layers, wherein each one of the plurality of layers comprises one or more nodes, wherein the one or more nodes may each be connected to one or more nodes of a previous or subsequent layer, wherein the connection between a set of nodes has a weighting coefficient that affects the strength of the signal between the set of nodes;
   categorizing the input as an output, wherein categorizing the input comprises using a sigmoid activation function with a loss function to assign a probability to the output, wherein the probability of the output is independent from that of a separate output, wherein the loss function is a categorical entropy classifier;
   calculating similarity with a similarity function between the facial features of the input and the facial features stored on the convolutional neural network, wherein the similarity function is a real-valued function that quantifies the similarity between two objects;
   determining whether the identified facial features of the input have been trained into the convolutional neural network;
   in response to determining that the identified facial features of the input have not been trained into the convolutional neural network,
      assigning the identified facial features of the input into a queue of the convolutional neural network;
      performing a scheduled job to train the identified facial features of the input into the convolutional neural network; and
   displaying information regarding the tenant via an I/O interface of the computer system.

2. The method of claim 1, further comprising capturing the image of the tenant with a camera.

3. The method of claim 2, wherein the camera produces recorded video, wherein the facial features are identified in individual frames of the recorded video.

4. The method of claim 1, further comprising of determining the presence of a head structure within the image.

5. The method of claim 1, further comprising of comparing the input to a local database using software prior to sending the input to the convolutional neural network.

6. The method of claim 1, wherein the output is between 0 and 1.

7. The method of claim 1, further comprising of excluding the output based on a threshold of acceptable probability.

8. The method of claim 1, wherein the input is queued and not trained within the convolutional neural network for calculating similarity.

9. The method of claim 8, wherein the input has a higher threshold of acceptable probability.

10. The method of claim 1, wherein the convolutional neural network has been trained with the input for calculating similarity.

11. The method of claim 1, further comprising of calculating a final probability score, wherein the displayed information is based on the final probability score.

12. The method of claim 11, further comprising of assigning the cropped image to existing tenant information within the convolutional neural network.

13. The method of claim 11, further comprising of adding the cropped image in conjunction with tenant information related to the tenant to the convolutional neural network.

14. A computer-readable non-transitory storage medium configured to:
   identify facial features within an image of a tenant, wherein the image is taken as the tenant enters into an office;
   crop an image of a tenant after the facial features have been identified;
   transmit the cropped image to a convolutional neural network as an input, wherein the convolutional neural network comprises a plurality of layers, wherein each one of the plurality of layers comprises one or more nodes, wherein the one or more nodes may each be connected to one or more nodes of a previous or subsequent layer, wherein the connection between a set of nodes has a weighting coefficient that affects the strength of the signal between the set of nodes;
   categorize the input as an output;
   use a sigmoid activation function with a loss function to assign a probability to the output, wherein the probability of the output is independent from that of a separate output, wherein the loss function is a categorical entropy classifier;
   calculate similarity with a similarity function between the facial features of the input and the facial features stored on the convolutional neural network, wherein the similarity function is a real-valued function that quantifies the similarity between two objects;
   determine whether the identified facial features of the input have been trained into the convolutional neural network;
   in response to determining that the identified facial features of the input have not been trained into the convolutional neural network,
      assign the identified facial features of the input into a queue of the convolutional neural network;
      perform a scheduled job to train the identified facial features of the input into the convolutional neural network; and
   display information regarding the tenant.

15. The computer-readable non-transitory storage medium of claim 14, wherein the computer-readable non-transitory storage medium is further configured to:
   determine the presence of a head structure within the image.

16. The computer-readable non-transitory storage medium of claim 14, wherein the computer-readable non-transitory storage medium is further configured to:
   calculate a final probability score, wherein the displayed information is based on the final probability score.

17. The computer-readable non-transitory storage medium of claim 16, wherein the computer-readable non-transitory storage medium is further configured to:
   assign the cropped image to existing tenant information within the convolutional neural network.

18. The computer-readable non-transitory storage medium of claim 16, wherein the computer-readable non-transitory storage medium is further configured to:
   add the cropped image in conjunction with tenant information related to the tenant to the convolutional neural network.

* * * * *